United States Patent [19]

Hokanson et al.

[11] Patent Number: 5,283,493
[45] Date of Patent: Feb. 1, 1994

[54] COLD AIR COOLING OF BRUSHES FOR MOTORIZED WHEELS

[75] Inventors: Paul R. Hokanson; George C. Veith, both of Girard, Pa.

[73] Assignee: General Electric Company, Erie, Pa.

[21] Appl. No.: 966,778

[22] Filed: Oct. 27, 1992

[51] Int. Cl.$^5$ .............................................. H02K 9/28
[52] U.S. Cl. ........................................ 310/227; 310/57
[58] Field of Search .................... 310/227, 52, 56, 57, 310/64, 241, 179, 184, 248

[56] References Cited

U.S. PATENT DOCUMENTS

| | | | |
|---|---|---|---|
| 3,486,055 | 12/1969 | Lipstein | 310/227 |
| 3,673,447 | 6/1972 | Zumbach et al. | 310/227 |
| 3,731,121 | 5/1973 | Cook et al. | 310/227 |
| 3,784,855 | 1/1974 | Motegi et al. | 310/227 |
| 4,092,556 | 5/1978 | Mabuchi | 310/57 |
| 4,626,720 | 12/1986 | Fukasaku et al. | 310/227 |

*Primary Examiner*—R. Skudy
*Assistant Examiner*—Matthew Nguyen
*Attorney, Agent, or Firm*—R. Thomas Payne

[57] ABSTRACT

A brush cooling system for a direct current electric motor of the type having a housing with an air inlet at one end for admitting forced cooling air to the motor and brushes located at an end of the motor distal from the air inlet, includes at least one air duct extending from the air inlet end of the motor through a space defined by adjacent stator windings of the motor and terminating at about an end of the windings opposite the air inlet end. A convergent nozzle is releasably connected to the terminating end of the air duct and extends from the air duct to an area generally adjacent the motor brushes for directing cooling air from the duct onto the brushes. Field coils of the stator windings are separated by air spaces and the air ducts extend through the air spaces between field coils. Each air space not including an air duct is substantially blocked by a baffle inserted in the space for inhibiting air flow through the air space. An air deflector is connected to the housing adjacent the distal end of the motor windings with an end of the air duct extending through the air deflector for connection to the nozzle. A bracket couples the nozzle to the air deflector for supporting the nozzle in the motor.

13 Claims, 3 Drawing Sheets

COLD AIR COOLING OF BRUSHES FOR MOTORIZED WHEELS

BACKGROUND OF THE INVENTION

This invention relates to direct current electric motors and, more particularly, to brush cooling systems for high horsepower, forced air ventilated electric motors.

The horsepower output of a dynamoelectric machine is generally derated when machine operating temperature exceeds some predetermined value. One particular area that is susceptible to higher temperature derating is the brush and commutator area of a direct current machine such as a DC motor. An aggravating factor in brush heating is that motor operation at high power output requires generally high current which increases the heating of the brush. In many high horsepower motors, some form of forced air ventilation is used to dissipate heat from the motor. The motor may be self-ventilated using some form of fan attached to a rotor shaft of the motor or may be ventilated externally by coupling a duct between the motor and a source of clean outside air. In general, air enters about one end of the motor, flows axially over the commutator, brushes, and risers and then over the armature windings, exiting at a drive end of the motor. However, in some motor designs and applications, air cannot enter from the commutator end and must be passed first through the armature before flowing over the commutator and brushes, resulting in the air reaching the brushes at 50°–60° C. hotter than the incoming ventilation air, thereby derating the motor.

U.S. Pat. No. 3,731,121 describes a motor of the type in which cooling air is injected from a drive end and of a type for which the present invention is particularly adapted. The motor is implemented in an electrically powered traction wheel in which the magnet frame or stator of an electric motor is made cylindrical and the wheel is rotatably mounted on the magnet frame such that the frame acts as a non-rotating axle for the wheel. The magnet frame has one end attached to or integral with a mounting flange which is used to secure the frame to a vehicle body.

The unusual manner in which the motor is mounted and forms the hub of the wheel does not allow use of conventional methods of introducing air to the motor for ventilating thereof. Maintenance and accessibility of the motor, particularly the current collector assembly and mechanical brakes, is best facilitated by placing them on the outboard side of the wheel. However, due to the semi-enclosed nature of the machine it is desirable to provide a forced ventilation system which is most conveniently applied from the inboard side of the wheel. The air flow path of such an arrangement passes axially through the motor, between the stator and the armature surface, over the commutator portion of the rotor, and out an opening in the outboard side of the wheel. When the air current reaches the commutator risers, the sudden step down to the smaller diameter commutator causes a disruption of air flow and prevents the air from passing in contiguous relationship with the commutator surface. The low pressure area which is created causes a decrease in air flow velocity and heat dissipation. Heat caused by brush friction, contact resistance losses and other factors is absorbed rather than being dissipated and the commutator temperatures increase to lower the rating of the motor.

The invention of U.S. Pat. No. 3,731,121 employs a baffle in the form of an annular air deflector secured to the inner wall of the stator or magnet frame at an axial position circumscribing the riser portion of the rotor between the armature or stator windings and the adjacent end of the commutator. Air currents traveling axially across the armature surface are deflected by the baffle toward the commutator to provide increased air velocity over the commutator surface and the brushes to increase the heat dissipation from the commutator and reduce brush temperature. The motor rating is increased by such cooling.

It will be recognized that the ventilating air flowing over the commutator in the above mentioned patent improves cooling by increased flow velocity and more assured contact with the commutator surface. The ventilating air is still flowed through the motor and therefore incurs a temperature rise of about 50° C. before reaching the commutator. In order to improve the power rating of such a machine, it would be desirable to provide a method and apparatus for cooling the commutator and brushes with lower temperature ventilating air and to further increase the flow of air at the brush-commutator interface.

SUMMARY OF THE INVENTION

In accordance with the present invention, there is provided an improved brush cooling system for a direct current electric motor of the type used in an electric motorized vehicle. The motor includes a plurality of stator windings coupled to a motor housing or magnet frame and a rotor disposed for rotation within the stator windings. One end of the rotor includes a commutator and the motor includes brushes operatively associated with the commutator for coupling electric power to the rotor. The motor housing has an air inlet at one end for admitting cooling air to the motor and the brushes are located at an end of the motor distal from the air inlet. The cooling system comprises at least one air duct extending from the air inlet end of the motor through a space defined by adjacent stator windings of the motor and terminates at about an end of the windings opposite the air inlet end.

A convergent nozzle is releasably connected to the terminating end of the air duct and extends from the air duct to an area generally adjacent the motor brushes for directing cooling air from the duct onto the brushes. Since the cooling air passes through the duct rather than over the surface of the windings, it is not heated by the windings and therefore reaches the brushes at about the inlet temperature.

The motor stator windings comprise a plurality of field coils with adjacent ones of the field coils separated by an air space. The air duct extends through the air space between the field coils. Each air space between coils which does not include an air duct is substantially blocked by a baffle inserted in the space for inhibiting air flow through the air space, thus maintaining sufficient back pressure to force air through normal flow channels over the winding surfaces.

BRIEF DESCRIPTION OF THE DRAWINGS

For a better understanding of the present invention, reference may be had to the following detailed description taken in conjunction with the accompanying drawings in which.

DETAILED DESCRIPTION

Figure 1:
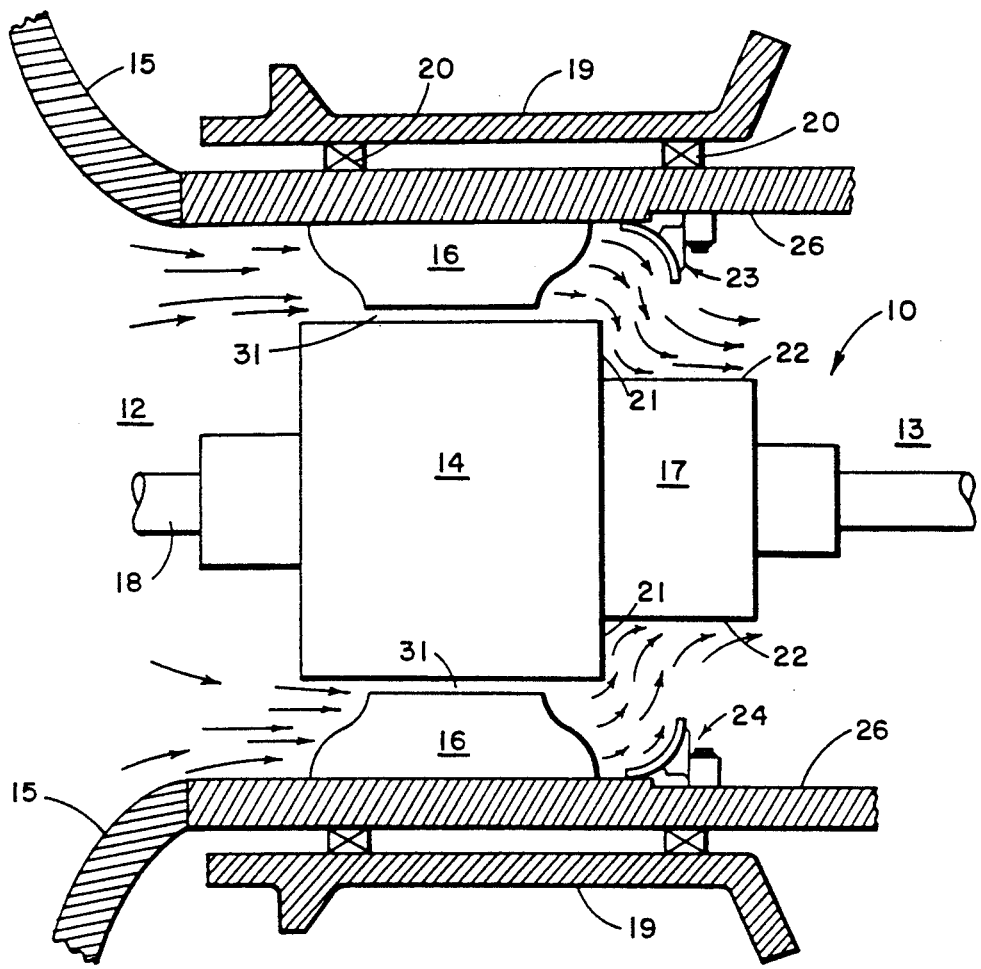
FIG. 1 is a simplified cross-sectional view of a dynamoelectric machine with a prior art ventilation system.

FIG. 1 is a simplified cross-sectional view of a motor 10 of the type used in an electric motorized wheel and which includes an annular baffle 23 for directing ventilating air (indicated by the arrows) onto a commutator 17. The ventilating air flows over the surface of the armature or rotor 14 around the stator coils 16 and out the commutator end 13 of the motor. The drive end 12 of the motor is connected to a vehicle frame 15 through the magnet frame or stator 11. The stator 11 is used as a wheel hub of the vehicle (not shown) with a wheel 19 connected to motor shaft 18 through a gear box (not shown). Wheel 19 rotates on frame 11 through bearing assemblies 20. The current transfer assembly (commutator 17 and brushes 31) are located on the outer or outboard side 13 of the wheel so that accessibility for maintenance is simplified. However, this arrangement limits the introduction of ventilating air to the current transfer assembly.

The indicated air flow provides adequate ventilation or cooling for the armature 14 and stator windings 16. However, the reduced diameter of the commutator 17 with respect to the armature 14 introduces an abrupt change in the area of the air channel causing a reduction in air velocity. The air deflectors 23 are secured to the inner wall of the stator frame so that the air flow pattern adjacent riser surface 21 is deflected radially inward toward commutator surface 22. The effect is to increase the air flow velocity over the surface 22 and increase heat transfer from the surface.

While the use of baffles 23 is effective to increase the rating of the motor 10, it is seen that the deflected air has flowed over the motor windings and its temperature increased by about 60° C. Further, the deflected air is directed generally at the commutator rather than specifically at the brush-commutator interface. In order to further enhance motor rating, it is desirable to provide lower temperature ventilating air to the commutator and to control the air so as to specifically enhance cooling of the motor brushes at their commutator interface.

Figure 3:
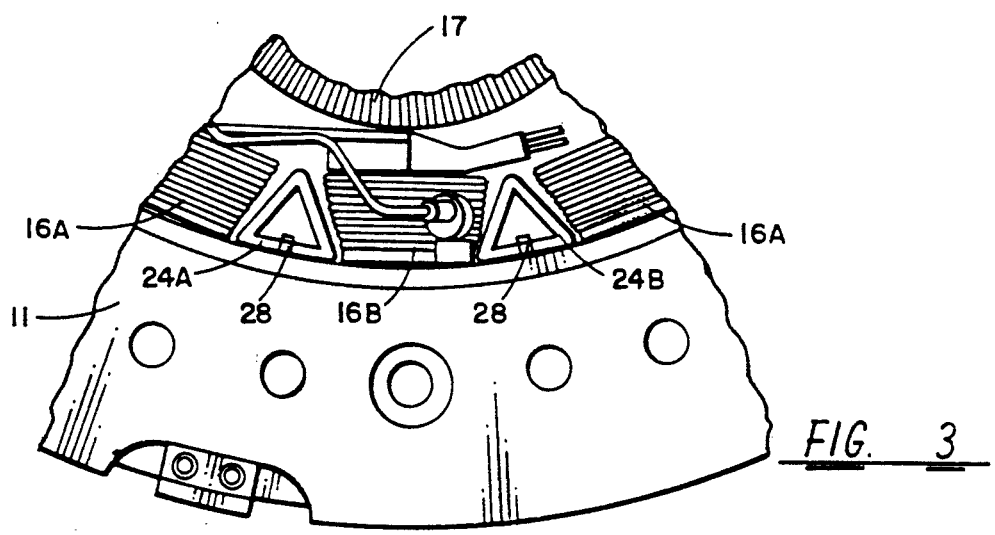
FIG. 3 is an end view of a portion of the machine of FIG. 2 showing air ducts in the stator windings.
Figure 2:
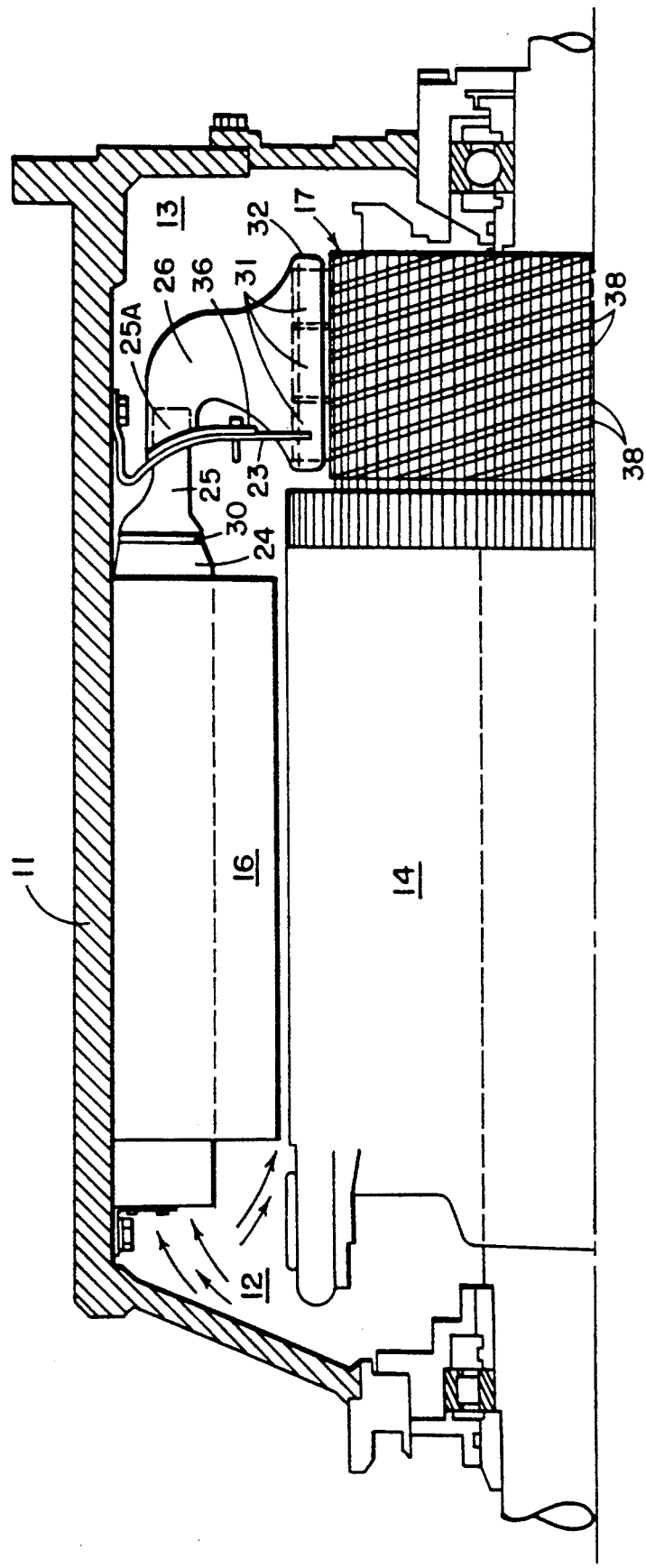
FIG. 2 is a simplified cross-sectional view of the dynamoelectric machine of FIG. 1 incorporating the teaching of the present invention.

Referring to FIG. 2, there is shown a simplified cross-sectional view of the motor 10 including air ducts 24 and nozzles 26 in accordance with the teaching of the present invention. The duct 24 extends longitudinally of the motor 10 between adjacent coils in the stator windings 16. Turning briefly to FIG. 3, there is shown a partial end view of the stator windings with a pair of ducts 24A, 24B inserted between coils. The coils are exciter coils 16A and commutator coil 16B which alternate in position about the motor stator. The coils are generally rectangular and when placed within the circular motor frame create triangular shaped spaces between coils. The ducts 24 are shaped triangularly to generally fill the space between adjacent coils. Since ducts are not required between each pair of adjacent coils, those remaining spaces are filled with a foamed insert or other material to limit air flow through the stator winding. If air flow were not limited, the ventilation air would flow through the stator winding and would not be forced along the armature and could result in overheating of the armature. The ducts 24 may be attached to the magnet frame of motor 10 using screws 28.

Figure 4A:
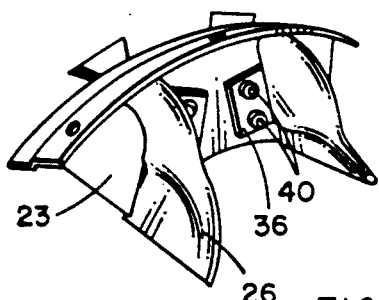
FIGS. 4A and 4B are outboard and inboard views of an air deflector and nozzle assembly in accordance with one form of the present invention.

Referring again to FIG. 2, the nozzles 26 are coupled to the ducts 24 via duct extensions 25. Each duct extension 25 incorporates a seal 30 of Neophrene or other suitable material which is pressed against an end of a duct 24. At seal 30, the duct extension 25 has a triangular shape conforming to the shape of duct 24. The duct extension 25 extends generally longitudinally changing to a generally round configuration with an end 25A protruding through a circular aperture 44 (FIG. 5) formed in deflector 23. The nozzle 26 slips over end 25A capturing a flexible seal 34 between the nozzle and deflector 23 to prevent air leakage. The nozzle 26 curves radially inward while changing to a flattened, elongated shape, as best seen in FIG. 4. The distal end 32 of nozzle 26 terminates adjacent a set of motor brushes 31 operatively positioned adjacent commutator 17. For the high horsepower, high current motor illustrated, three brushes 31 are connected in parallel and simultaneously engage common commutator bars on commutator 17. The manner in which the brushes are mounted is well known in the art and does not form part of the present invention. The seal 34 positioned about the nozzles 26 at the deflector 23 both seals the apertures and supports the nozzles with minimum vibration. A bracket 36 extends from each nozzle 26 and is bolted to deflector 23 to further support the nozzle. The bracket 36 is shown best in FIG. 4A.

The view of FIG. 2 also shows a spiral cuts or grooves 38 formed around commutator 17. The grooves 38 creates air passageways under the abutting surfaces of the brushes 31. Ventilating air blown through the grooves 38 from nozzles 26 acts directly on the adjacent surfaces of the brushes 31 to enhance cooling. Since the brush surfaces in contact with commutator 17 represent the hottest portion of the brushes, the application of cooling or ventilating air at this surface is particularly useful in enhancing motor rating.

Reference is now made to FIGS. 3–6 in sequence to explain the installation and construction of the present invention. FIG. 3 is a commutator end view of a segment of a motor showing a pair of triangular shaped air ducts extending between adjacent pairs of field coils. FIG. 4A illustrates an outboard side of an air deflector 23 with a pair of nozzles 26 attached. The nozzles 26 are preferably molded of fiberglass or other suitable material and have an integral mounting bracket 36 which is arranged to abut the deflector surface when the nozzle 26 is assembled to the deflector 23. Screws or bolts 40 attach the bracket 36 to deflector 23. The inward curvature of the nozzles and their flattened air exit end can be seen in FIG. 4A.

Figure 4B:
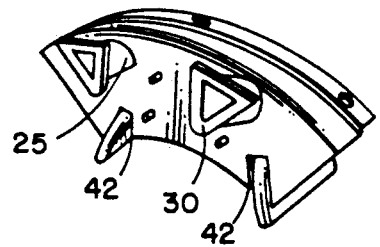

FIG. 4B is a view of the inboard side of deflector 23 showing the duct extensions 25 and seals 30 protruding through the deflector. FIG. 4B also shows slots 42 at the inboard edge of the deflector 23 for accommodating the extended width of the nozzle exit ends. The nozzle exit end is widened to assure distribution of ventilating air over the longitudinal extent of the multiple motor brushes 31. Note in both FIGS. 4A and 4 that the nozzle is sealed about the aperture through the deflector 23.

Figure 5:
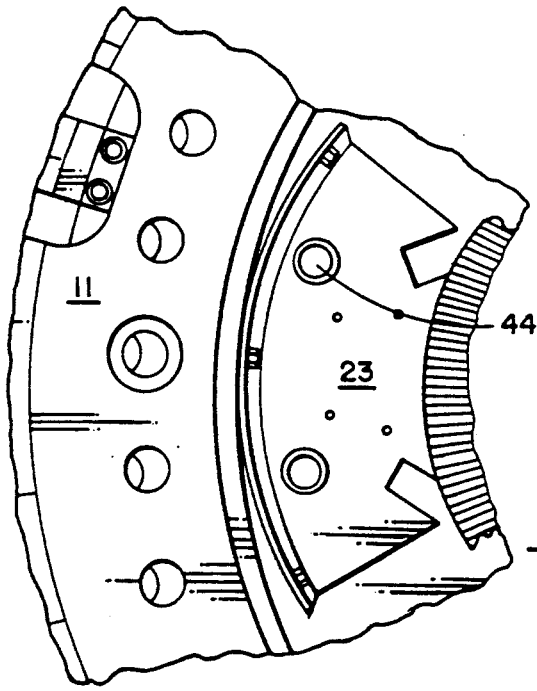
FIG. 5 is a view corresponding to FIG. 3 with an air deflector installed.
Figure 6:
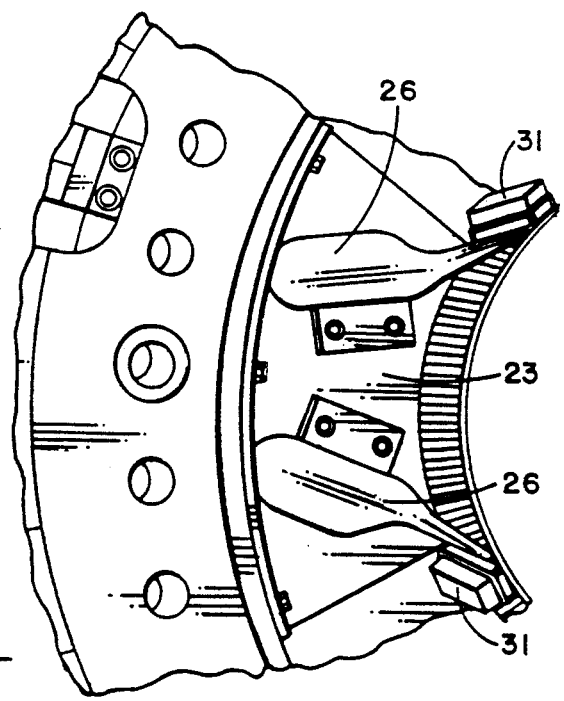
FIG. 6 is a view corresponding to FIG. 3 with the air deflector and nozzle assembly of FIG. 4A installed.

FIG. 5 is a motor end view corresponding to FIG. 3 with a deflector 23 installed but without the duct extensions 25 and nozzles 26. The deflector 23 is bolted to the stator or magnet frame 11. The apertures 44 through which the duct extension ends 25A pass are visible in this view. In FIG. 6, the deflector 23 with installed nozzles 26 is shown in a final assembled position. It can be seen that the nozzles 26 are shaped to direct a flow of air along the commutator surface with the air exit end of the nozzles positioned adjacent the brushes 31.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A brush cooling system for a direct current electric motor, the motor including a plurality of stator windings coupled to a motor housing and a rotor disposed for rotation within the stator windings, one end of the rotor including a commutator and the motor including brushes operatively associated with the commutator for coupling electric power to the rotor, the motor housing having an air inlet at one end thereof for admitting cooling air to the motor, the brushes being located at an end of the motor distal from the air inlet, the system comprising:

at least one air duct extending from an air inlet end of a motor through a space defined by adjacent stator windings of the motor and terminating at about an end of the windings opposite the air inlet end;

a convergent nozzle releasably connected to the terminating end of said air duct, said nozzle extending from said air duct to an area generally adjacent a motor brush for directing cooling air from said duct onto the brush; and the stator windings comprising a plurality of field coils, adjacent ones of the field coils being separated by an air space, said air duct extending through selected ones of the air spaces between said field coils, and a baffle inserted in each air space not including an air duct for substantially blocking air flow through said each air space.

2. The cooling system of claim 1 wherein the motor includes a plurality of brushes, air ducts being positioned in a plurality of the said air spaces for conveying cooling air to each of the brushes.

3. The cooling system of claim 2 and including an air deflector connected to the housing adjacent the distal end of the motor windings, an end of said air duct extending through said air deflector for connection to said nozzle, and bracket means coupling said nozzle to said air deflector for supporting said nozzle in the motor.

4. The cooling system of claim 1 wherein said nozzle is positioned for directing air onto the motor brush at an interface of the brush and a commutator.

5. The cooling system of claim 4 wherein the commutator is formed with spiral grooves and cooling air from said nozzle is directed into said grooves passing under the brush for cooling at least a portion of a face of the brush in contact with the commutator.

6. The cooling system of claim 1 wherein the field coils comprise a plurality of exciter field coils alternately arranged with a plurality of commutator field coils, the air spaces being formed at a longitudinal interface between the exciter coils and the commutator coils.

7. The cooling system of claim 1 wherein said nozzle terminates adjacent the brush in an end portion having a width substantially corresponding to a width of the brush and a thickness defining an opening of about 0.25 inch.

8. The cooling system of claim 3 wherein said air deflector is arranged to direct cooling air passing through the stator windings and rotor into a radially inward direction onto the commutator for effecting cooling of the commutator.

9. A brush cooling system for an electric motorized wheel assembly, the wheel assembly having an inner end and an outer end and having a stator supported at the inner end of the assembly on a vehicle frame, a rotor mounted in the stator with a commutator adjacent the outer end of the wheel assembly and a drive means at the inner end of the assembly, a wheel rotatably mounted on the stator and operatively connected to the drive means, and ventilation means for forcing air axially across the rotor from its drive end toward its commutator end, an air deflected mounted to the stator in an axial position proximately surrounding the commutator for directing a flow of ventilating air toward the commutator, a plurality of brushes connected to the stator and positioned in rubbing contact with the rotating commutator, at least one air duct extending through the stator for conveying ventilating air from the inner end of the wheel assembly to the commutator end of the rotor, and a nozzle coupled to the air duct at the commutator end and terminating adjacent said brushes for directing ventilating air onto said brushes at their interface with the commutator.

10. The system of claim 9 wherein the commutator is formed with spiral grooves and the ventilating air is at least partially forced into the grooves for cooling faces of said brushes in rubbing contact with the commutator as the commutator and grooves rotate under said brushes.

11. The system of claim 9 wherein said nozzle is releasably supported on the air deflector.

12. The system of claim 9 and including a plurality of brushes circumferentially spaced about the commutator, a plurality of air ducts extending through the stator for conveying ventilating air to each brush and a nozzle operatively coupled to each air duct for directing a flow of ventilating air onto each brush at its respective interface with the commutator.

13. The system of claim 9 wherein said nozzle is a convergent nozzle for increasing air velocity impinging on the brushes.

* * * * *